(12) United States Patent
Gödde et al.

(10) Patent No.: US 7,048,633 B2
(45) Date of Patent: May 23, 2006

(54) ELASTIC COUPLING

(75) Inventors: Peter Gödde, Dorsten (DE); Michael te Uhle, Rhede (DE)

(73) Assignee: A. Friedr. Flender Aktiengesellschaft, (DE)

( * ) Notice: Subject to any disclaimer, the term of this patent is extended or adjusted under 35 U.S.C. 154(b) by 178 days.

(21) Appl. No.: 10/706,247

(22) Filed: Nov. 12, 2003

(65) Prior Publication Data

US 2004/0097289 A1    May 20, 2004

(30) Foreign Application Priority Data

Nov. 13, 2002   (DE) ................... 102 53 092

(51) Int. Cl.
*F16D 3/68* (2006.01)
*G08B 29/12* (2006.01)

(52) U.S. Cl. ...................................... 464/23
(58) Field of Classification Search .............. 464/23, 464/73, 81–83, 87
See application file for complete search history.

(56) References Cited

U.S. PATENT DOCUMENTS

| 4,102,052 A | * | 7/1978 | Bloch ........................ 356/23 |
| 5,009,110 A | * | 4/1991 | Lang et al. ............. 73/862.322 |
| 5,450,761 A | * | 9/1995 | Zilberman et al. ..... 73/862.329 |
| 6,257,075 B1 | * | 7/2001 | Bachnak ................ 73/862.322 |

FOREIGN PATENT DOCUMENTS

| DE | 1773305 | 11/1971 |
| EP | 0 971 142 | 1/2000 |
| GB | 1 146 836 | 3/1969 |
| GB | 1 434 736 | 5/1976 |
| GB | 2 310 291 | 8/1997 |
| JP | 57104836 | 12/1980 |
| JP | 60243531 | 12/1985 |
| JP | 63117231 | 5/1988 |
| JP | 11295106 | 10/1999 |

* cited by examiner

*Primary Examiner*—Kenneth Thompson
(74) *Attorney, Agent, or Firm*—Robert W Becker & Associates; Robert W Becker

(57) ABSTRACT

An elastic coupling is provided and has first and second coupling parts that are rotatable relative to one another and engage one another via elastomeric elements. A coupling gap remains between the coupling parts. A marking is disposed on the outer edge of one of the coupling parts, and an indicator plate is disposed on the outer edge of the other of the coupling parts. The marking and indicator plate serve for a determination of a relative angle of torque of the coupling parts, wherein the marking and indicator plate are disposed on the coupling parts such that they are centered relative to one another. The marking and indicator plate abut the coupling gap.

4 Claims, 2 Drawing Sheets

ELASTIC COUPLING

CROSS-REFERENCES TO RELATED APPLICATIONS

The specification incorporates by reference the disclosure of German priority document 102 53 092.0 filed Nov. 13, 2002.

BACKGROUND OF THE INVENTION

The present invention relates to an elastic coupling having two coupling parts that are rotatable relative to one another and engage one another via elastomeric elements.

Such elastic couplings are used in order, in a unit, to connect drive motors with a work machine or with a transmission. In a number of applications, a planned or unplanned stoppage of the drive motor results in a considerable interruption in production in the unit or plant, accompanied by correspondingly high costs. The coupling manufacturers specify regular inspections in their operating manuals in order to check the wear condition of the elastomeric elements in such couplings and hence, by timely replacement of the elastomeric elements, to prevent an unplanned interruption or a shutdown of the unit.

In addition to the interruption in production, the stoppage of the drive motor, for the purpose of checking the wear condition of the elastomeric elements, means a considerable assembly effort, since the drive motor must be protected against an unintentional activation, and the coupling guard, which is prescribed by official guidelines for the protection against rotating components, must be disassembled and after the wear measurement must again be reassembled.

The elastomeric elements, depending upon their use, generally have an expected service life of between three and eight years. The inspection is prescribed in conformity with the length of operation or also in fixed time intervals, for example yearly. In this connection, the rotational play of the coupling is determined with the drive and the coupling stopped, whereby a coupling component is rotated without torque, until it is limited by a stop, and a marking is applied to both coupling parts. By rotating the coupling part in the opposite direction of rotation until it is limited by a stop, the markings move apart. The distance between the markings provides a visible indication of the rotational play, in which the wear of the elastomeric elements plays a part.

It is therefore an object of the present invention to provide an elastic coupling of the aforementioned general type that enables the measurement of the wear condition of the elastomeric elements when the coupling is rotating.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The elastic coupling of the present application comprises a first coupling part; a second coupling part, wherein the two coupling parts are rotatable relative to one another, and engage one another via elastomeric elements, wherein a coupling gap remains between the coupling parts; a marking disposed on the outer edge of one of the coupling parts; and an indicator plate disposed on the outer edge of the other of the coupling parts, wherein the marking and indicator plate serve for a determination of a relative angle of torque of the coupling parts, wherein the marking and indicator plate are disposed on the coupling parts such that they are centered relative to one another, and wherein the marking and indicator plate abut the coupling gap.

A marking and an indicator plate on the rotating coupling parts can be made visible by suitable means, for example via a strobe light having an infinitely adjustable flash frequency. If the flash frequency of the strobe light is synchronized with the speed of the coupling, the marking and the indicator plate appear to stand still for an observer. The relative displacement of the coupling parts, which results from the angle of torque, can be obtained from the indicator plate. The relative displacement represents the sum of joint play resulting from assembly, elastic deformation of the elastomeric elements due to the torque load, as well as the wear of the elastomeric elements. Thus, the wear of the elastomeric elements can, without stopping the drive, be monitored via the indicator plate that is visible during rotation of the coupling.

Further specific features of the present invention will be described in detail subsequently.

DESCRIPTION OF PREFERRED EMBODIMENTS

Figure 1:
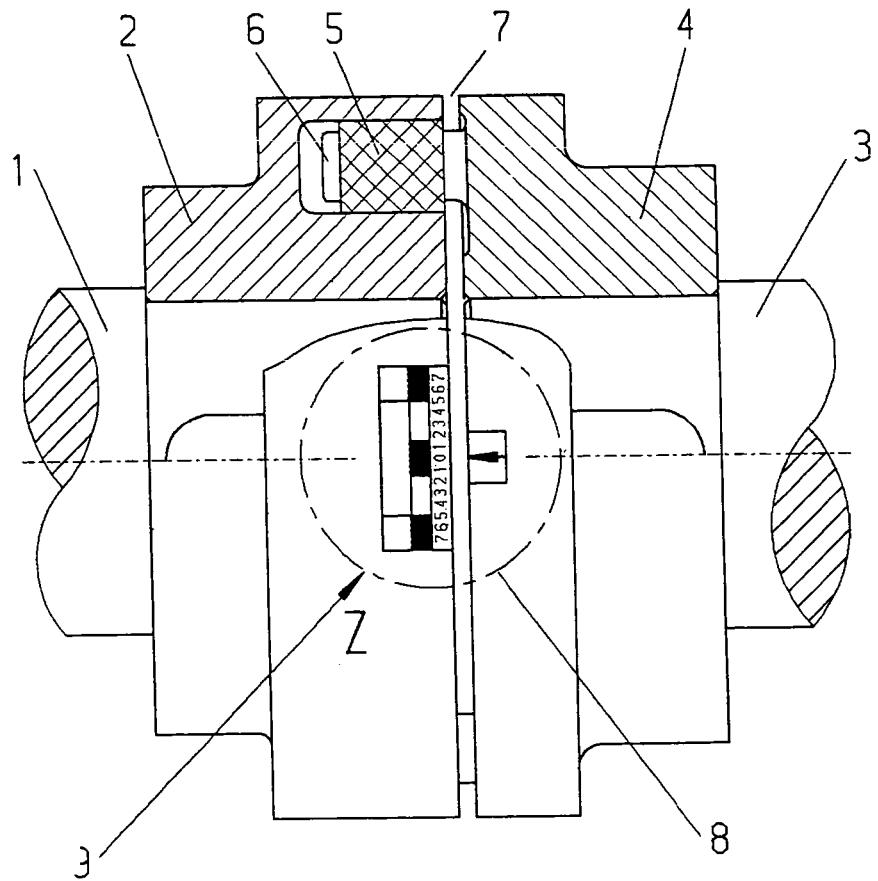
FIG. 1 shows, partially in a longitudinal cross section and partially in a side view, one exemplary embodiment of an inventive elastic coupling.
Figure 2:
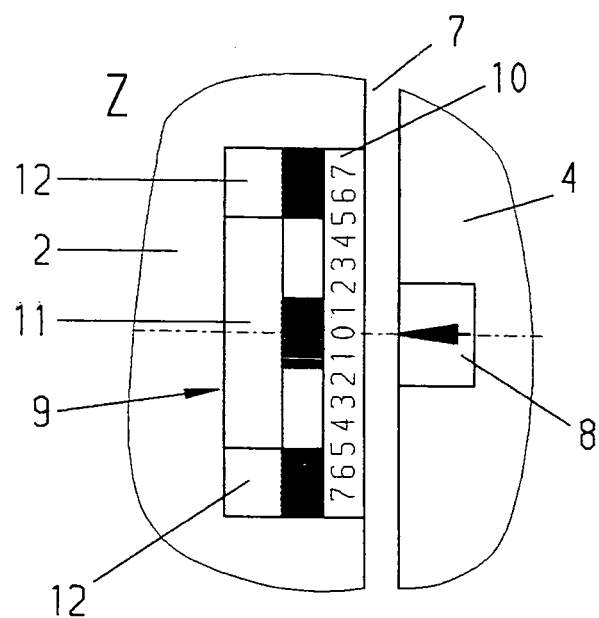
FIG. 2 is a detailed view of the encircled portion Z of FIG. 1.
Figure 3:
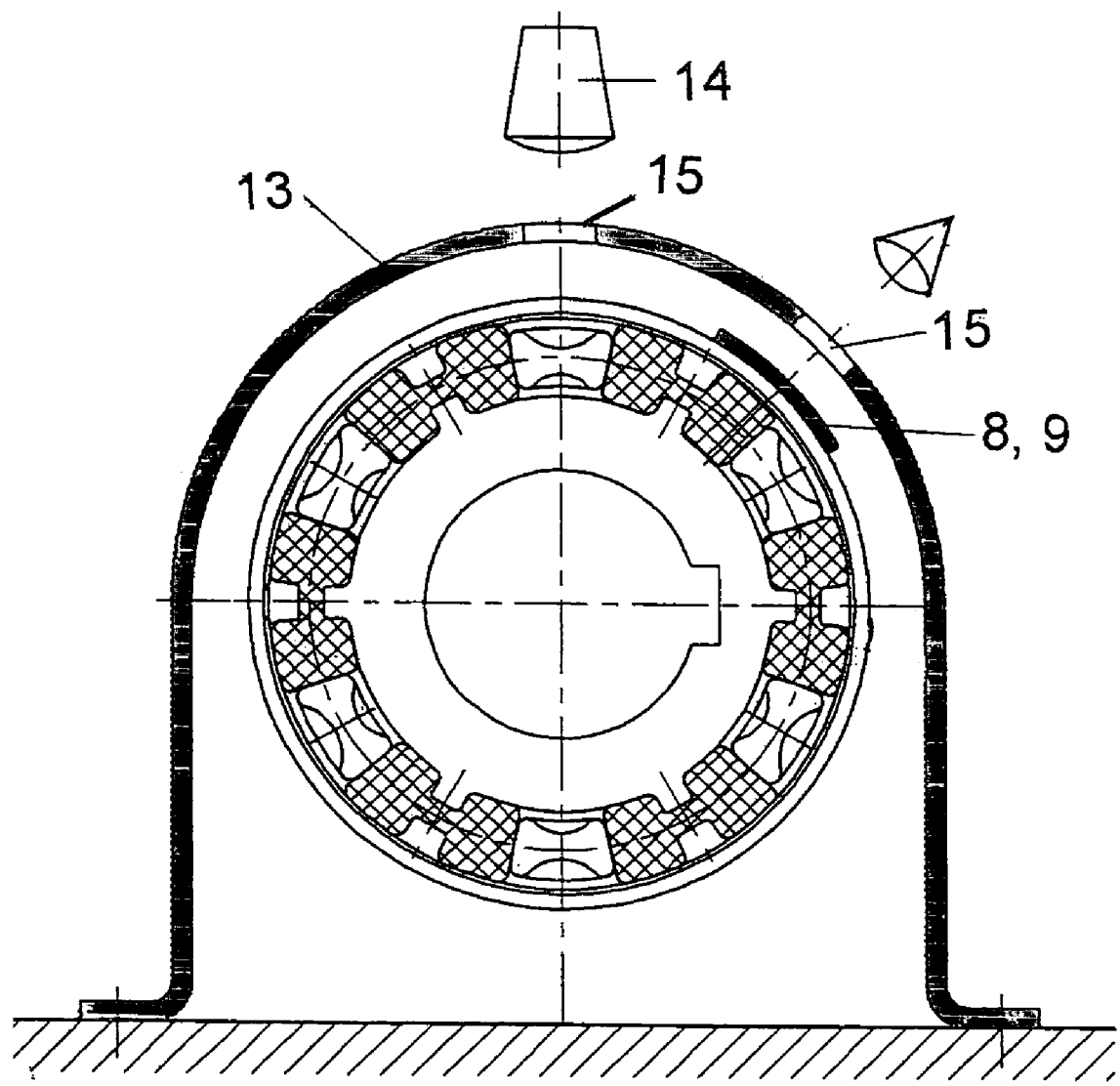
FIG. 3 shows a coupling having a coupling guard.

Referring now to the drawings in detail, the elastic coupling illustrated in FIG. 1 is an elastic cam or jaw coupling. This coupling comprises a first coupling part 2, which is connected with the shaft 1 of a drive motor, and a second coupling part 4, which is connected with the shaft 3 of a work machine. Disposed in the first coupling part 2, along a circular arc, are a plurality of pockets that are spaced from one another; a respective elastomeric element 5 is inserted into each of the pockets. The second coupling part 4 is provided with projections 6 that respectively extend into the first coupling part 2 into the free spaces between the elastomeric elements 5.

The transfer of torque from the motor shaft 1 to the work machine shaft 3 is effected via the elastomeric elements 5 and the projections 6. In this connection, the elastomeric elements 5 essentially determine the transfer characteristics of the coupling. A coupling gap 7 remains between the two coupling parts 2 and 4. As a consequence of the elastomeric elements 5, when subjected to torque the first coupling part 2 and the second coupling part 4 are at a relative angle of torque relative to one another, which is visible at the coupling gap 7. Instead of the elastic cam coupling that was described, other elastic couplings could also be utilized that also contain elastomeric elements, such as elastic bolts, beads, disks, or intermediate ring couplings.

Disposed on the outer edge of the second coupling part 2, which edge is adjacent to the coupling gap 7, is a marking 8. Secured centrally relative to the marking 8 on the outer edge of the first coupling part 2, which edge is also adjacent to the coupling gap 7, is an indicator plate 9. The marking 8 and the indicator plate 9 can be disposed on the coupling parts 2,4, for example, by labels, by engraving, by lacquering, or by some other similar method.

When the coupling is subjected to torque, the relative angle of torque between the first and second coupling parts 2, 4 effects a relative displacement of the marking 8 and of the indicator plate 9 relative to one another. The relative displacement represents the sum of joint play resulting during assembly, of elastic deformation of the elastomeric elements 5 due to the torque, as well as of wear of the elastomeric elements 5. The position of the marking 8 and indicator plate 9 relative to one another is hence an indication for the wear condition of the elastomeric elements 5.

The indicator plate 9 comprises a scale, which preferably contains a numerical or digital sequence 10. The digit 0 of the scale represents the position of the coupling parts 2,4 relative to one another when the coupling is not running. The scale of the indicator plate 9 preferably also has a plurality of indication fields, for example a central indication field 11 and two side indication fields 12. In this connection, the central indication field 11 represents the permissible range, and the two side indication fields 12 represent the impermissible range, of the wear condition of the elastomeric elements 5. By means of the numerical or digital sequence 10, or the indication fields 11, 12, the progress of the wear can be plotted against time, and the wear condition can be quantified.

In operation, in other words with a coupling that is rotating at nearly constant speed, the position of the indicator plate 9 and the marking 8 is made visible via a conventional strobe light having an infinitely adjustable flash frequency. The strobe light is combined with the coupling in such a way that the intermittent beam of the strobe light is directed onto the marking 8 and the indicator plate 9. With the aid of a measurement and control unit, the speed of the coupling and the flash frequency of the strobe light are measured and compared with one another. The flash frequency of the strobe light is set in such a way that it is synchronized with the speed of the coupling.

Pursuant to the official machine guidelines of the European Union, the coupling is to be surrounded at a radial spacing by a tubular coupling guard. The coupling guard 13 is provided with inspection openings or apertures 15 that enable the light of the strobe lamp 14 to fall upon the marking 8 and the indicator plate 9. Further inspection openings that are offset thereto permit the position of the marking 8 and indicator plate 9 to be read. This eliminates the otherwise conventional disassembly and subsequent reassembly of the coupling guard.

The present invention is, of course, in no way restricted to the specific disclosure of the specification and drawings, but also encompasses any modifications within the scope of the appended claims.

We claim:

1. An elastic coupling, comprising:
   a first coupling part;
   a second coupling part, wherein said first and second coupling parts are rotatable relative to one another and engage one another via elastomeric elements, and wherein a coupling gap remains between said first and second coupling parts;
   a marking disposed on an outer edge of one of said coupling parts; and
   an indicator plate disposed on an outer edge of the other of said coupling parts, wherein said marking and said indicator plate serve for a determination of a relative angle of torque of said first and second coupling parts, wherein said indicator plate comprises a scale which indicates an actual range that results from said angle of torgue, a maximum permissible range and an impermissible range, as an indication for the wear of said elastomeric elements, wherein said marking and said indicator plate are disposed on said coupling parts such that they are centered relative to one another, and wherein said marking and said indicator plate abut said coupling gap.

2. An elastic coupling according to claim 1, wherein said coupling is combined with a stationarily disposed strobe light, an intermittent beam of which is directed onto said marking and said indicator plate, and wherein a flash frequency of said strobe light is synchronized with a rotational speed of said coupling.

3. An elastic coupling, comprising:
   a first coupling part;
   a second coupling part, wherein said first and second coupling parts are rotatable relative to one another and engage one another via elastomeric elements, and wherein a coupling gap remains between said first and second coupling parts;
   a marking disposed on an outer edge of one of said coupling parts; and
   an indicator plate disposed on an outer edge of the other of said coupling parts, wherein said marking and said indicator plate serve for a determination of a relative angle of torque of said first and second coupling parts, wherein said marking and said indicator plate are disposed on said coupling parts such that they are centered relative to one another, and wherein said marking and said indicator plate abut said coupling gap; and wherein a tubular coupling guard is provided that surrounds, and is radially spaced from, said first and second coupling parts, and wherein said coupling guard is provided with openings in an area that is swept over by said marking and said indicator plate during a rotation of said coupling.

4. An elastic coupling according to claim 3, wherein said coupling is combined with a stationarily disposed strobe light, an intermittent beam of which is directed onto said marking and said indicator plate, and wherein a flash frequency of said strobe light is synchronized with a rotational speed of said coupling.

* * * * *